Dec. 31, 1963    R. D. ALLEN    3,116,347
SEWAGE TREATING DEVICE
Filed Oct. 8, 1959    2 Sheets-Sheet 1

ROBERT D. ALLEN  INVENTOR.

BY

Charles L. Lovendahl

Dec. 31, 1963  R. D. ALLEN  3,116,347
SEWAGE TREATING DEVICE
Filed Oct. 8, 1959  2 Sheets-Sheet 2
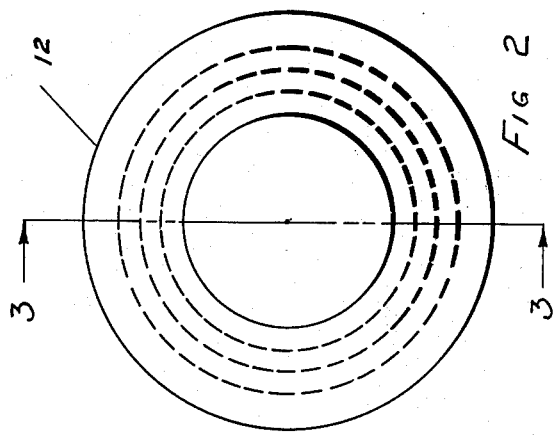
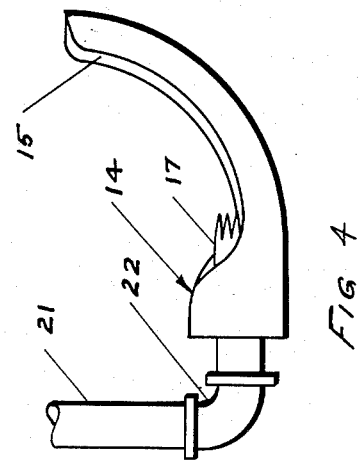
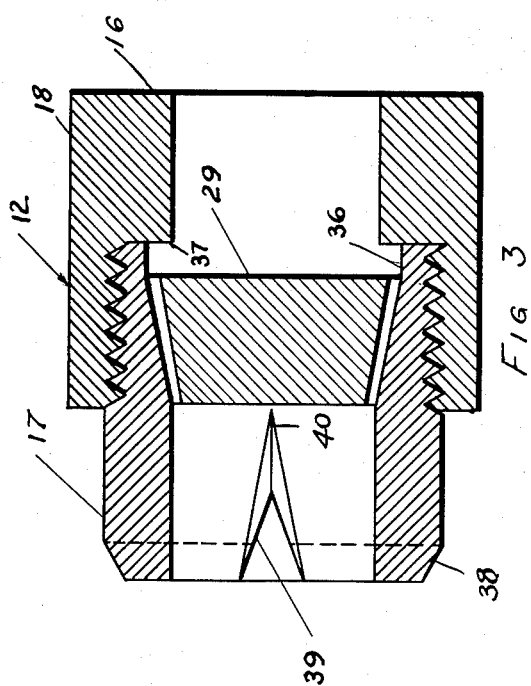
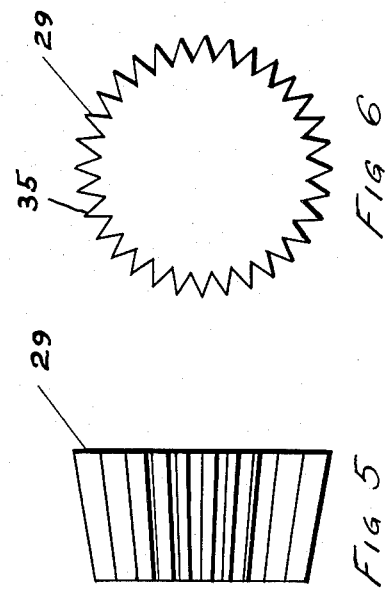
ROBERT D. ALLEN  INVENTOR.
BY
Charles L. Lovercheck
attorney 3,116,347
SEWAGE TREATING DEVICE
Robert D. Allen, 379 Niles-Cortland Road SE., Warren, Ohio
Filed Oct. 8, 1959, Ser. No. 845,129
3 Claims. (Cl. 261—26)

This invention relates to improvements in machines for the treatment of sewage.

The present invention further relates to improvements in a mechanism for the treatment of sewage by the activated sludge process, the treatment of organic wastes for disposal into sewage drainage systems, and an improved means of processing sewage in residential septic tank disposal systems.

The device disclosed herein is also adapted for use in sewage plants which carry out the activated sludge process. The activated sludge process amounts to the mixing of raw sewage with the active return sludge to inoculate the raw sewage with the bacteria of the return sludge. The bacteria contained in the return sludge in conjunction with air which is introduced into the sewage tank under pressure will decompose the sewage. According to the general process, the sewage is inoculated with biological organisms which, in the presence of oxygen, promote the purification process. To provide oxygen for aeration to oxidize and destroy the decomposable organic matter contained in the sewage, an improved aerating device is provided herein.

It has been found that the aeration of sewage by any device which contains a moving part of such construction as to restrict the free flowing of such articles as cloth, elastic products, wood, or other non-digested articles in sewage is objectionable and requires constant observation and service. It has also been found that the size of the air bubble cannot be held to a constant small size in a water jet injector or a porous plate if the size of bubble is to be small enough to remain in suspension in the affluent filled water. It has also been found that any mechanical means used to break down or pulverize the solids of a sewage system or furnish water from the treatment tank itself must be attached to the sewage tank with the necessity of repair, access ports, seals, etc.

Prior septic tank aerators had numerous disadvantages. Some provided an inconveniently located motor on top of the tank with an impeller down in the tank. This required a special tank and mounting. The motor extended above ground level and presented an obstacle to pedestrains. These aerators were subject to clogging. Other tanks utilized paddles. Still others used submersible pumps inside a secondary tank which had to be dug out along with its electrical wiring to repair it.

The invention disclosed herein is especially suitable for residential septic tank systems. It constitutes an improvement over the jet systems which required a mixture of affluent water to mix with air. These devices are subject to difficulty from clogging. The present invention eliminates the possibility of the air mixing device becoming clogged by solids entrained in the fluid.

The present device provides a greater dispersion of air bubbles in the fluid, thereby providing a greater saturation of oxygen therein. The air nozzle of the present device is designed to be self-cleaning of any entrained solids and foreign matter. The nozzle is so located in the tank that it causes a constriction and resulting turbulence and thorough mixing of the fluid and air without restricting the flow of undissolved solids.

The air nozzle directs the fluid and entrained air through a curved path defined by a spoon shaped device open on one side. This creates a turbulence and a circulation in the tank. It directs the fluids to the surface in a turbulent path. It directs and scrubs the solids against the tank wall, thus reducing their size. The turbulent action inoculates the affluent water with bacteria activated sludge from the bottom settlement.

The device disclosed requires no special tank, no special openings or ports, no special fixtures, or no special holding devices in the tank itself. It may be installed and removed through the normal entrance port in the tank. Only one inch of space above the tank is required.

In using the apparatus according to the invention, air is introduced under pressure to a sewage tank through a pipe from an air compressor located at any convenient remote location. It then enters an air scrubbing device which is submerged below the surface. The air is released into the liquid from the scrubbing device in a number of very small diameter streams which results in extremely fine bubbles. The air scrubber is so constructed that water from the tank flows around each air stream and is forced under pressure into a curved spoon or swirler. This portion of the device directs the air sewage mixture against the side of the tank in a circular motion toward the surface of the liquid level, effecting a breaking down of the solids and a circulation of the mixture. The air device is non-clogging and self-cleaning. The scrubber is a non-clogging, non-moving device.

This invention involves an improved device for aeration, pulverization, and circulation of organic matter with a complement of bacteria activated sludge and is suitable for use in industrial, commercial, and residential systems.

It is, accordingly, an object of the present invention to provide an aerating device, especially for use in sewage plants, which reduces the possibility of the aerating device becoming clogged by foreign objects such as rags entrained in the sewage.

Another object of the invention is to provide an improved device for controlling the size and, thereby, increasing the number and exposed surface of the air bubbles which are introduced into the sewage and, therefore, providing a greater saturation of oxygen in the sewage fluid than with devices heretofore.

Still another object of the invention is to provide an air inlet nozzle device constructed to be self-cleaning of entrained foreign matter.

A further object of this invention is to provide a device having a circulation of the fluid and a scrubbing action of the entrained solids against a wall of a tank, thus effecting a breaking down and a reduction in the size of the solids being scrubbed against the side walls. The turbulent action of this circulation mixes the incoming affluent with the bacteria activated sludge from the accumulated bottom settlings.

A still further object of the invention is to provide an apparatus which does not require any special tanks, special openings, special ports, special fixtures, or any holding devices in the tank itself. This device may be installed in a tank and removed from the tank without disturbing any part of a tank except its normal entrance port.

Yet a further object of the invention is to provide an aerating device which is simple in construction, economical to manufacture, and simple and efficient to install.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 2 is a front view of the air inlet nozzle;

FIG. 3 is a cross sectional view of the air inlet nozzle taken on line 3—3 of FIG. 2;

FIG. 4 is a plan view of the air scrubbing and activating device;

FIG. 5 is a left side view of the air diffuser which is incorporated in the air inlet nozzle; and FIG. 6 is a front view of the air diffuser incorporated in the air inlet nozzle.

Figure 1:
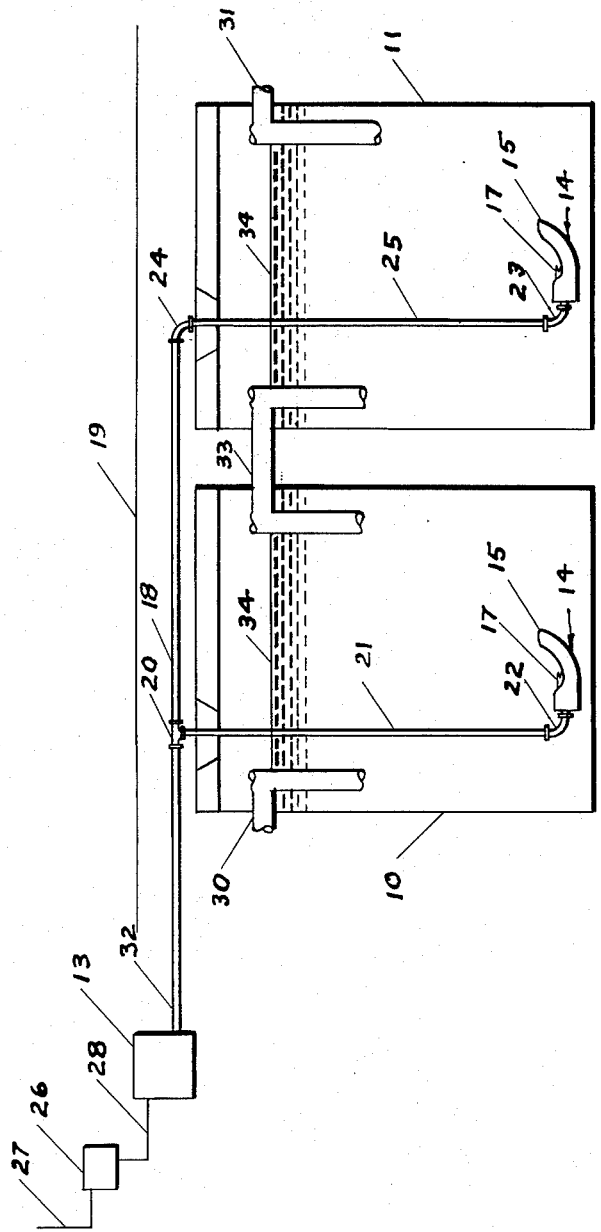
FIG. 1 is a schematic diagram of a sewage treatment system according to the invention.

Now with more specific reference to the drawings, the sewage treatment device disclosed herein may be made up of two tanks 10 and 11 connected in series with each other by an overflow pipe 33 which is a U-shaped pipe having ends extending down into the liquid in each of the tanks 10 and 11; however, a system utilizing the apparatus and method disclosed may be made using a single tank. The pipe 33 acts both as an overflow and a skimmer.

Each tank 10 and 11 has an air scrubbing device 14 therein which contains an aerator 12 to which air is supplied from a compressor 13 driven by an electric motor supplied with power from lines 27 and 28 through a timer 26 to operate the compressor 13 at predetermined intermittent intervals as determined by the requirements for the individual installation. Raw sewage is admitted to the tank through an inlet pipe 30 and treated sewage is discharged through an outlet 31. The sewage will usually retain a level 34 controlled by the L-shaped outlet pipe 31 and the overflow pipe 33. The compressor 13 is connected to the air scrubbing device by pipes 18, 21, 25, and 32 connected by elbows at 22, 23, and 24 and a T at 20.

The air scrubbing devices connected to the pipe 21 by means of the elbows 22 are made up of a curved spoon 15 which has an upwardly directed, arcuate shaped, open top channel therein and is supported in the tank adjacent the bottom thereof supported to direct a stream of air tangent to the side of the tank. The curved spoon 15 has a closed end adjacent the pipe 21 and this end is fitted to the aerator 12.

The aerator 12 is made up of a body 16 which is hollow and has an internally threaded counterbore at one end which receives an externally threaded nozzle 17. The nozzle 17 has an internally, outwardly diverging inner periphery adjacent the threaded end which receives a frusto-conical shaped insert 29. The frusto-conical insert 29 has axially disposed, peripherally spaced, V-shaped grooves 35 in the outer periphery thereof which allow air to flow from the pipe 21 to the nozzle 17.

The nozzle 17 has an internal cylindrical bore 36 at the threaded end which allows the frusto-conical shaped insert 29 to be moved back against a shoulder 37 formed at the counterbore if, for any reason, the grooves become clogged by some foreign matter.

The outer end of the nozzle 17 is chamfered at 38 and peripherally spaced grooves 39 are formed therein. The grooves 39 are widest at the outer ends of the nozzle 17 and extend clear through it and are narrowest and shallowest at the inner end at 40. Therefore, the grooves 39 present a generally sawtoothed appearance to the end of the nozzle 17.

The device may be installed at or below the ground level 19 and the pipe 18 may be buried below the ground level. This will make it possible to almost completely conceal the treating device and the tanks 10 and 11 below the surface of the ground.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a sewage tank and an air scrubbing means, means to support said air scrubbing means in said tank in proximate relation to the bottom thereof, said air scrubbing means comprising a curved spoon having a channel shaped surface therein, the inner bottom of said channel shaped surface being curved and defining a curved path, an aerating device in said curved spoon disposed at one end of said curved path, means to connect a source of compressed air to said aerating device, said aerating device comprising a hollow cylindrical body with passage means therethrough wherein said passage means has an inlet connected to said compressed air connection means and an outlet opening into said curved path of said spoon for discharging air therein, said passage means having a frusto-conical chamber portion with its larger diameter located at said passage inlet and extending into said body, said passage means also having a cylindrical portion extending from said outlet into said body and communicating with said frusto-conical portion, a frusto-conical insert located in said frusto-conical chamber portion, said insert having V-shaped, axially extending grooves in its outer periphery which define air flow passages, said body having a chamfered outer periphery and peripherally spaced, axially extending V-shaped notches at its outlet end.

2. The combination recited in claim 1 wherein a second sewage tank is provided, and conduit means connecting said tanks, said second sewage tank having air scrubbing means therein.

3. The combination recited in claim 2 wherein timer means is provided to control said compressed air source.

References Cited in the file of this patent

UNITED STATES PATENTS

| | | |
|---|---|---|
| 538,861 | Boehmen | May 7, 1895 |
| 2,616,848 | Griffith | Nov. 4, 1952 |
| 2,643,104 | Holden | June 23, 1953 |
| 2,660,132 | Pyenson | Nov. 24, 1953 |
| 2,666,740 | Gordon | Jan. 19, 1954 |
| 2,707,624 | Shames et al. | May 3, 1955 |
| 2,718,275 | Banks | Sept. 20, 1955 |
| 2,921,488 | Davis | Jan. 19, 1960 |
| 2,978,234 | Lamb | Apr. 4, 1961 |

FOREIGN PATENTS

| | | |
|---|---|---|
| 565,426 | Belgium | Mar. 31, 1958 |
| 743,697 | Great Britain | Jan. 18, 1956 |
| 875,798 | Great Britain | Aug. 23, 1961 |